United States Patent [19]

Ikumi

[11] Patent Number: 4,860,242
[45] Date of Patent: Aug. 22, 1989

[54] PRECHARGE-TYPE CARRY CHAINED ADDER CIRCUIT

[75] Inventor: Nobuyuki Ikumi, Tokyo, Japan

[73] Assignee: Kabushiki Kaisha Toshiba, Kawasaki, Japan

[21] Appl. No.: 294,940

[22] Filed: Jan. 5, 1989

Related U.S. Application Data

[63] Continuation of Ser. No. 157,152, Feb. 11, 1988, abandoned, which is a continuation of Ser. No. 684,749, Dec. 21, 1984, abandoned.

[30] Foreign Application Priority Data

Dec. 24, 1983 [JP] Japan ................................. 58-248517

[51] Int. Cl.⁴ .............................................. G06F 7/50
[52] U.S. Cl. .................................................. 364/768
[58] Field of Search .......................... 364/768, 784–788

[56] References Cited

U.S. PATENT DOCUMENTS

| | | | |
|---|---|---|---|
| 3,603,766 | 9/1971 | Weinberger | 364/784 |
| 3,636,334 | 1/1972 | Svoboda | 364/786 |
| 3,675,001 | 7/1972 | Singh | 364/784 |
| 3,700,875 | 10/1972 | Saenger et al. | 364/787 |
| 3,723,715 | 3/1973 | Chen et al. | 364/784 |
| 3,728,532 | 4/1973 | Pryor | 364/787 |
| 3,767,906 | 10/1973 | Pryor | 364/784 |
| 3,843,876 | 10/1974 | Fette et al. | 364/784 |
| 4,052,604 | 10/1977 | Maitland et al. | 364/786 |
| 4,152,775 | 5/1979 | Schwartz | 364/786 |
| 4,399,517 | 8/1983 | Niehaus et al. | 364/784 |
| 4,417,314 | 11/1983 | Best | 364/785 |
| 4,425,623 | 1/1984 | Russell | 364/787 |
| 4,471,454 | 9/1984 | Dearden et al. | 364/786 |
| 4,523,292 | 6/1985 | Armer | 364/786 |
| 4,536,855 | 8/1985 | Morton | 364/786 |
| 4,541,067 | 9/1985 | Whitaker | 364/784 |
| 4,563,751 | 1/1986 | Barker | 364/786 |
| 4,564,921 | 1/1986 | Suganuma | 364/784 |
| 4,573,137 | 2/1986 | Ohhashi | 364/788 |
| 4,592,007 | 5/1986 | Ohhashi | 364/784 |
| 4,601,007 | 7/1086 | Uya et al. | 364/784 |
| 4,604,723 | 8/1986 | Burrows | 364/786 |
| 4,621,338 | 11/1986 | Uhlenhoff | 364/784 |

OTHER PUBLICATIONS

Agrawal et al., "On Multiple Operand Addition of Signed Binary Numbers", pp. 1068–1070, vol. C-27, No. 11, IEEE Transactions on Computers (11/78).

Kouvaras et al., "A Digital System of Simultaneous Addition of Several Binary Numbers", pp. 992–997, IEEE Transactions on Computers (10/68).

Hwang, Computer Arithmetic Principles, Architecture, and Design (1979).

Mead et al., Introduction to VSLI Systems, pp. 150–154 (1980).

*Primary Examiner*—Gary V. Harkcom
*Assistant Examiner*—Long Thanh Nguyen
*Attorney, Agent, or Firm*—Finnegan, Henderson, Farabow, Garrett, & Dunner

[57] ABSTRACT

In a prehcarge-type carry chained adder circuit, stages as represented by adders are grouped into a plurality of blocks each consisting of a plurality of stages. When the propagating functions of the stages of each block are active, a carry signal reproduced from the preceding block is transferred to the succeeding blocks through a bypass circuit.

5 Claims, 3 Drawing Sheets

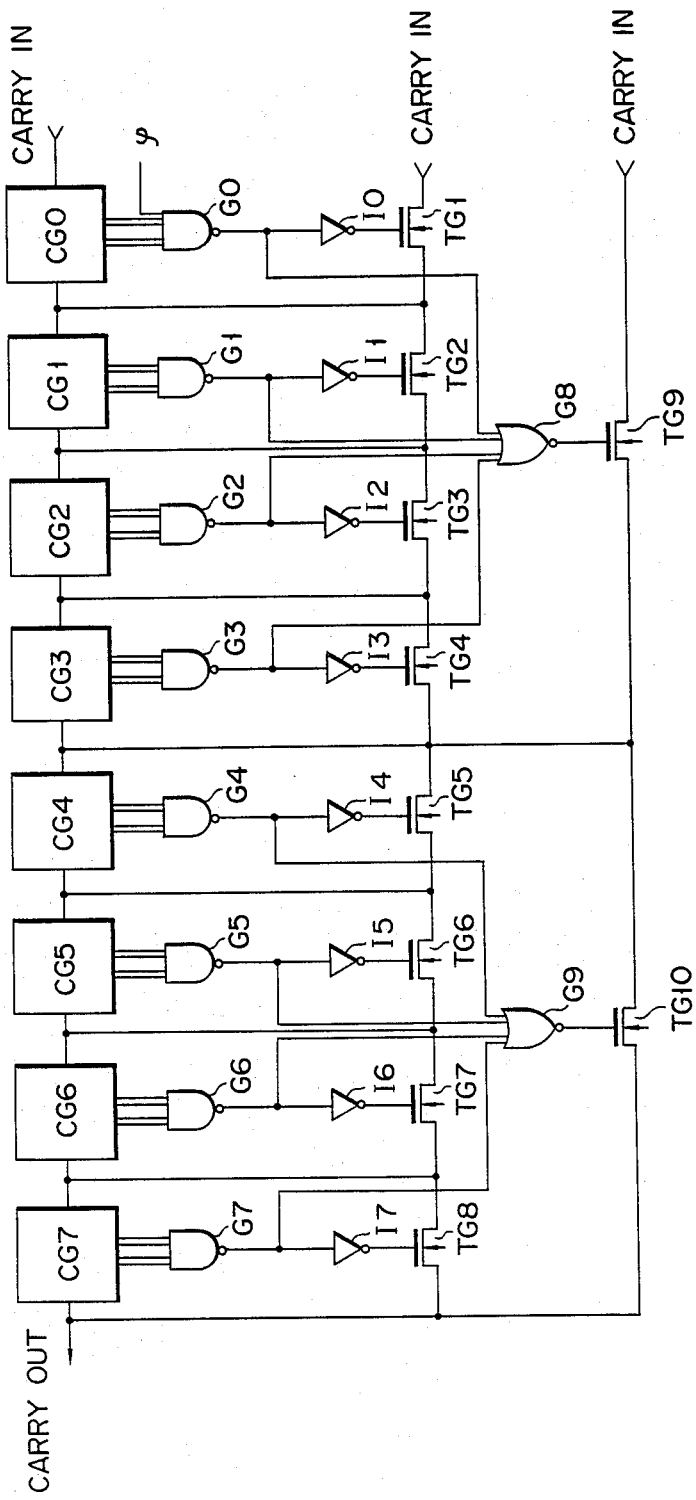
F I G. 5

PRECHARGE-TYPE CARRY CHAINED ADDER CIRCUIT

This application is a continuation of application Ser. No. 157,152, filed Feb. 11, 1988, now abandoned, which is a continuation of Ser. No. 684,749 filed Dec. 21, 1984, now abandoned.

BACKGROUND OF THE INVENTION

The present invention relates to a precharge-type carry chained adder circuit well adaptable for high speed addition.

FIG. 1 shows a circuit diagram illustrating a one-stage part of a Manchester-type carry chained adder constructed with N type MOSFETs. The adder receives a precharge signal $\phi$, a carry kill signal $\overline{K}$, a carry propagation signal $\overline{P}$, and a carry in signal Carry-in, and produces carry propagation signals P' and $\overline{P}'$ and a carry-out signal Carry-out.

One of the most important problems involved in such an adder circuit is how to quickly send a carry signal to a more significant digit position. To cope with this problem, various types of high speed adders have been proposed. The approach to speeding up the carry signal reproduction, however, suffers from a large increase in additional hardware.

A known carry look-ahead circuit is advantageous in the reproduction speed of the carry signal, but is disadvantageous in the additional and complicated hardware. The carry look-ahead circuit further requires multi-input gates. The use of the multi-input gates is not recommended for the MOSFET circuit, particularly a CMOS circuit.

For these reasons, there is a great demand for realizing a high speed adder with a simple construction which can be adapted for the MOSFET circuit. One of the adder circuits thus far proposed to meet such a demand is a precharge type carry chained adder circuit. In this type of adder circuit, a carry is reproduced through N type transfer gates. With this arrangement, if each node in the transfer gate circuit is previously precharged to "H" a high level before the reproduction of a carry, a high speed reproduction of the carry is realized. In this arrangement, however, when no carry occurs, each node must be discharged through the gates connected in series between the carry-in and carry-out. In an extreme case, the gates corresponding in number to the word length of the adder must be connected in series. Therefore, as the word length of the adder is increased, the delay time resulting when the carry signal is reproduced is long and problematic.

SUMMARY OF THE INVENTION

Accordingly, an object of the present invention is to provide a precharge-type carry chained adder circuit which operates with a high speed carry reproduction and is remarkably improved in the operating speed, particularly when a lengthy word is added, thereby resulting in an increase in speed to perform addition.

Additional objects and advantages of the invention will be set forth in part in the description which follows, and in part will be obvious from the description, or may be learned by practice of the invention. The objects and advantages may be realized and attained by means of the instrumentalities and combinations particularly pointed out in the appended claims.

According to the present invention, there is provided a precharge-type carry chained adder circuit having a plurality of precharge-type carry chained adders connected in a cascade fashion. The adder circuit comprises AND gates for generating logical products of the carry-propagating functions of each of a plurality of blocks of the precharge-type carry chained adder circuit, and transfer control elements each for jumping, when the logic gate is active, a carry signal from the preceding block to the succeeding block over the present stage of the block.

BRIEF DESCRIPTION OF THE DRAWINGS

FIG. 5 is a block diagram of a precharge-type carry chained adder circuit which is an embodiment of the present invention.

DETAILED DESCRIPTION OF THE PREFERRED EMBODIMENTS

An embodiment of a precharge-type carry chained adder circuit according to the present invention will be described referring to the accompanying drawings.

Figure 1:
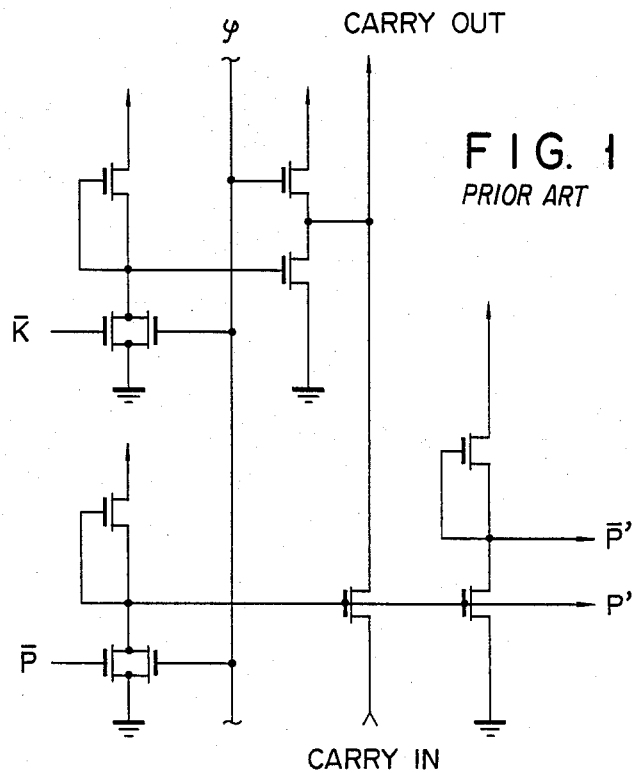
FIG. 1 shows a circuit diagram of a one-bit portion of a Manchester-type carry chained adder circuit constructed with N type MOSFETs.
Figure 2:
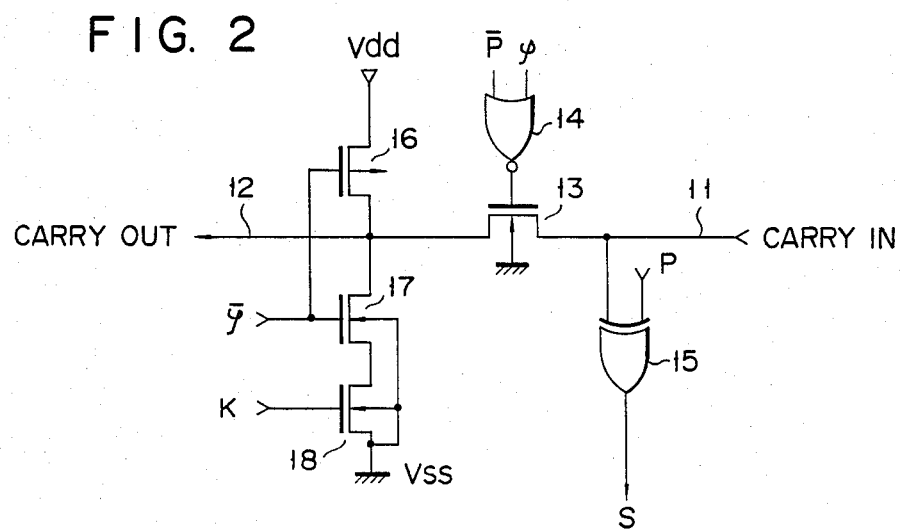
FIG. 2 shows a circuit portion of one of a plurality of cascaded connected stages in an adder circuit according to an embodiment of the present invention which stages correspond to a word length.

FIG. 2 shows a circuit portion of one stage in a precharge-type carry chained adder circuit. An N type MOSFET 13 is inserted between a carry-in 11 and a carry-out 12. A precharge signal $\phi$ and a carry propagation signal $\overline{P}$ are NORed by a NOR gate 14. The output signal of the NOR gate 14 is connected to the gate of the N type MOSFET 13. The carry-in 11 and the carry propagation signal P are exclusively ORed by an EX-OR circuit 15. The output signal from the EX-OR circuit 15 is output as an addition output S. A P type MOSFET 16 is inserted between a power source Vdd and the carry-out 12. The source-drain paths of two N type MOSFETs 17 and 18 are connected in series between the carry-out 12 and a power source Vss. The gates of the MOSFETs 17 and 16, to which a precharge signal $\phi$ is applied, are interconnected with each other. A carry kill signal K is applied to the gate of the MOSFET 18.

Figure 3:
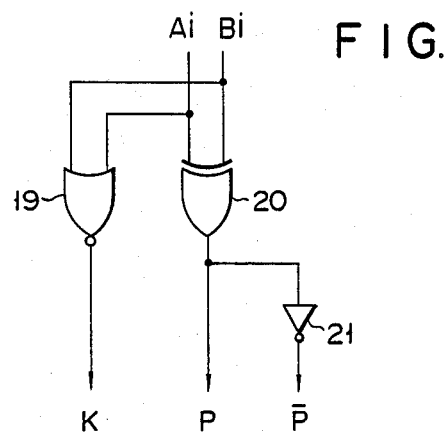
FIG. 3 shows a circuit diagram of a circuit for producing a carry propagation signal and a carry kill signal, which are applied to the adder of FIG. 2.

The carry propagation signals P and $\overline{P}$, and the carry kill signal K can be produced by, for example, a logic circuit as shown in FIG. 3. The circuit of FIG. 3 is coupled with input signals corresponding to an addend Ai and an augend Bi in each adder stage of the adder circuit. To be more specific, the input signals Ai and Bi are applied to a NOR gate 19 and an EX-OR circuit 20, respectively. Then, the NOR gate 19 produces the carry kill signal K. The EX-OR circuit 20 produces the carry propagation signal P. The carry propagation signal P is inverted by an inverter 21 forming a carry propagation signal $\overline{P}$.

In operation, when the precharge signal $\phi$ is in "H" level, the node of the carry-out 12 is precharged to "H" level. During the precharging, the carry propagation signal (function) P and the carry kill signal (function) K are produced from the input signals Ai and Bi. These functions P and K are given by the following logical expressions:

$$P = Ai \oplus Bi \quad (1)$$

$$K = Ai + Bi. \quad (2)$$

Then, when the precharge signal $\phi$ changes to the low "L" level, the adder operates in each stage according to the functions P and K in the following way. When the function P is active, no carry from the present adder stage to the upper order adder stage occurs. The node, which has been precharged to "H" level, is discharged to be in "L" level. When the functions P and K are both inactive, a carry is made from the present adder stage to the next upper order adder stage.

Figure 4:
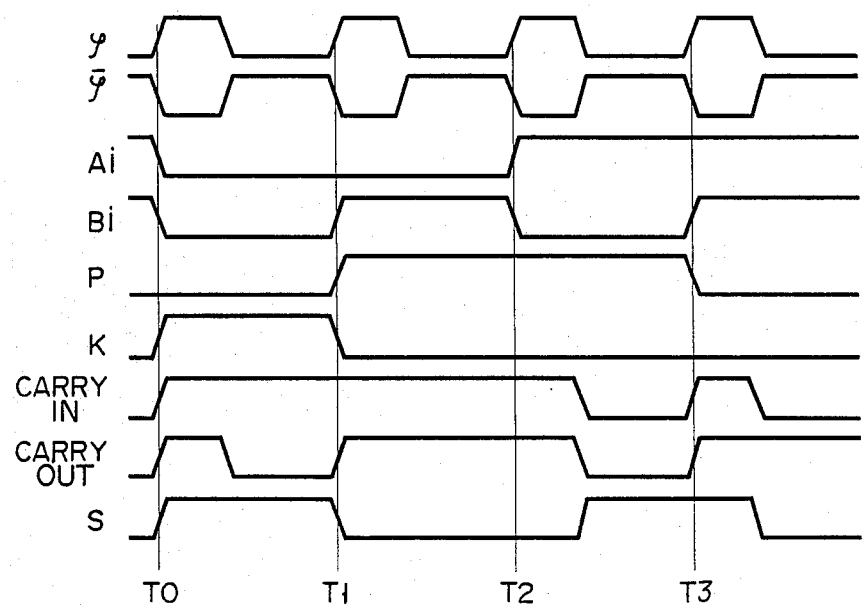
FIG. 4 shows a set of waveforms illustrating the operation of the adder of FIG. 2.

Turning now to FIG. 4, there are shown waveforms for illustrating the operation of the adder of FIGS. 2 and 3. Logical levels of the input signals Ai and Bi change with time as follows: "0" and "0" at time To; "0" and "1" at time T1; "1" and "0" at time T2; and "1" and "1" at time T3. With the change of the input signals Ai and Bi and the carry-in signal, the adder produces a carry kill signal K, a carry propagation signal P, and an output sum signal S.

For an additional word length of n, n stages of the adders each arranged as shown in FIG. 2 must be connected in a cascade fashion. Accordingly, when the function P is active in all of the stages and the carry-in is "0", the nodes of all the adders must be discharged to be in "L" level. Delay times of the transistors connected in series considerably increase as the stages of the adders are increased.

In the present invention, the adders of n stages are grouped into blocks each consisting of adders of j stages, from the lower to higher order stages successively. Using a carry-propagating function P of each of the j adders, the block carry propagating function Q is generated:

$$Q = P1, P2 \ldots Pj \quad (3),$$

where P1, P2 ... Pj represent respectively carry-propagating functions of the adder stages, of each block consisting of adders of j stages.

FIG. 5 shows a circuit arrangement of a 32-stage adder circuit which is an embodiment of the present invention. Each of adder groups CGo, CG1 ... CG7 has adders of 4 digits. Each adder is constructed with a CMOS circuit as shown in FIG. 2. In each adder group, a carry of one adder stage is reproduced to a carry input of the next adder stage from the lower order stage to the higher stage. The carry reproduction signals of the 4 stages of adders in the adder groups CGo, CG1 ... CG7 are input to NAND gates Go, G1 ... G7, respectively. The output signals of the NAND gates Go, G1 ... G7 are applied through inverters Io, I1 ... I7 to transfer gates TG1, TG2 ... TG8, which are provided in association with the adder groups CGo, CG1 ... CG7. These transfer gates TG1, TG2 ... TG8 are connected in series with one another. The least significant end of the series connection of the transfer gates is used as a carry-in, while the most significant end of the series circuit is used as the carry-out. This series circuit of the transfer gates serves as a bypass circuit for the carry signal.

The outputs of the NAND gates Go, G1 ... G3 are connected to a first NOR gate G8. The outputs of the succeeding NAND gates G4–G7 are connected to a second NOR gate G9. The NOR outputs of the NOR gates G8 and G9 are connected to the gates of transfer gates TG9 and TG10, respectively. The transfer gates TG9 and TG10 are connected in series with each other. The least significant end of the series circuit is used as a carry-in, while the most significant end is used as a carry-out. The series circuit serves as a bypass circuit for the carry signal.

Such an adder circuit has the longest reproducing time of the carry signal, when a carry kill signal is produced at the lest significant digit and the carry reproduction is performed at the remaining stages. In such a case, in the conventional adder circuit as mentioned above, a "0" signal must pass through the number of the transfer gates corresponding to the number of stages of the adder circuit.

On the other hand, in the FIG. 5 embodiment, when the carry kill signal is produced at the least significant stage and the carry reproduction takes place at the remaining stages, the carry is reproduced in the following way. A carry signal is produced in the least significant adder group CGo and passes through three stages of the transfer gates TG2, TG3 and TG4 in succession. Then, the carry signal is separated to travel through two routes. One of the separated carry signals travels through transfer gates TG5 and TG6. The other carry signal passes through the transfer gates TG10 and TG8. Therefore, the carries are through the same number of stages of transfer gates and reach the nodes on both sides of the transfer gate TG7, repsectively. Accordingly, the adder group CG6 is applied with "0" from both the upper and the lower order stages. A value at each node is established by delays of two stages of the transfer gates. Also in such a case, the carry passes through only ten stages of the transfer gates. This number of transfer gates is a remarkable reduction in the number of the transfer gates required, when compared with 31 stages required in the transfer gates of the conventional adder circuit with the same number of stages as those of the adder circuit of the present invention. Therefore, the reproduction delay of the carry is considerably reduced.

Accordingly, when the block carry reproduction function Q is active, that is, the carry reproducing function of a block is active, a carry signal from the preceding block may be reproduced to the succeeding block, bypassing the present block. At the same time, the present block can be applied with a carry reprducing function from the upper order side of the block . Therefore, the reproduction time of the carry signal in the present block is approximately halved.

Alternatively, the block carry reproducing functions of a plurality of blocks can be gathered to form a large block. The by-passing operation of the carry signal is applied to these large blocks and the number of transfer gates through which the carry signal passes can further be reduced.

It will be apparent to those skilled in the art that various modifications and variations can be made in the precharge-type carry chained adder circuit of the present invention without departing from the scope or spirit of the invention. Thus, it is intended that the present invention cover the modifications and variations of the invention provided they come within the scope of the appended claims and their equivalents.

What is claimed is:

1. A precharge-type carry chained adder circuit apparatus comprising:
   a plurality of adder groups, each adjacent adder group corresponding to a plurality of bits constituting a successive portion of a multibit word,
   each of the plurality of adder groups having a first carry-in node and a first carry-out node, the first carry-out node of each of the plurality of adder groups being connected to the first carry-in node of the adder group corresponding to a more significant portion of the multibit word,
   each of the adder groups constituting a plurality of individual adder units, each of the adder units corresponding to a single bit of the respective successive portion of the multibit word,
   each of the adder units having a first carry transfer control gate connecting a unit carry-in node and a unit carry-out node
   and output means connected to the unit carry-in node for providing an addition output, the first transfer control gate of each of the adder units being connected in series with the unit carry-out node of the adder unit being connected to the unit carry-in node of an adjacent adder unit, each adjacent adder unit corresponding to a more significant bit of the respective portion of the multibit word,
   precharging means connected to the first transfer control gate of each of the adder units for precharging a respective one of the adder units in accordance with a precharge signal,
   signal generating means connected to the first transfer control gate and the output means of each of the adder units for generating a carry propagating signal for a respective one of the adder units when a carry results from an addition operation in the respective one of the adder units, and
   discharging means connected to the unit carry-out node of each of the adder units for discharging the unit carry-out node of a respective one of the adder units when no carry is propagated in the respective one of the adder units;
   a plurality of second carry transfer control gates, each having a second carry-in node and a second carry-out node, said second transfer control gates being connected in series, with the second carry-out node of one of the second transfer gates connected to the second carry-in node of an adjacent second transfer control gate, said connected second carry-in and carry-out nodes of each of the second transfer control gates being connected to the connected first carry-in and carry-out nodes of each of the adder groups;
   a NAND gate for each of the plurality of adder groups, each of the NAND gates having an input from a respective one of the plurality of adder groups and an output connected to a respective one of the plurality of second control transfer gates.

2. The adder circuit apparatus according to claim 1, further comprising:
   a plurality of third carry transfer control gates, each having a third carry-in node and a third carry-out node, said third carry transfer control gates being connected in series, with the third carry-out node of one of the third transfer gates connected to the third carry-in node of an adjacent third transfer control gate, said connected third carry-in and carry-out nodes of a first of the plurality of third carry transfer control gates being connected to the connected first carry-in and carry-out nodes connecting first and second predetermined numbers of the adder groups and the connected second carry-in and carry-out nodes of the corresponding first and second predetermined numbers of the second carry transfer control gates, the third carry-out node of a second of the plurality of third carry transfer control gates being connected to the first carry-out node of the second predetermined number of the adder groups and the second carry-out node of the corresponding second carry transfer control gate; and
   a plurality of NOR gates, each having an input from each of the first and second respective predetermined number of the adder groups and an output connected to a respective one of the plurality of third carry control transfer gates.

3. The adder circuit according to claim 2, in which said third control transfer gates includes at least one bypass transistor.

4. The adder circuit according to claim 1, in which said adder circuit includes at least one Complementary Metal Oxide Semiconductor (CMOS) transistor.

5. The adder circuit according to claim 1, in which said first and second transfer control gates are transfer gates.

* * * * *